United States Patent
Ha et al.

(10) Patent No.: US 8,515,166 B2
(45) Date of Patent: Aug. 20, 2013

(54) METHOD OF COMPRESSING A BLOCK-BASED BINARY IMAGE

(75) Inventors: Sang-hoon Ha, Seoul (KR); Sang-jo Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1167 days.

(21) Appl. No.: 12/381,553

(22) Filed: Mar. 13, 2009

(65) Prior Publication Data
US 2009/0238453 A1    Sep. 24, 2009

(30) Foreign Application Priority Data

Mar. 18, 2008    (KR) .................. 10-2008-0024892

(51) Int. Cl.
*G06K 9/00* (2006.01)
*G06K 9/36* (2006.01)
*G06K 9/46* (2006.01)

(52) U.S. Cl.
USPC .......................................... 382/166; 382/232

(58) Field of Classification Search
USPC .................. 382/166, 165, 232, 239
See application file for complete search history.

(56) References Cited

U.S. PATENT DOCUMENTS

| | | | |
|---|---|---|---|
| 5,331,442 A * | 7/1994 | Sorimachi | 358/532 |
| 5,742,400 A * | 4/1998 | Satoh | 382/262 |
| 6,049,567 A | 4/2000 | Han | |
| 6,049,631 A | 4/2000 | Kim | |
| 6,529,633 B1 * | 3/2003 | Easwar et al. | 382/239 |
| 6,744,919 B2 * | 6/2004 | Said | 382/166 |
| 6,876,773 B2 | 4/2005 | Mizuno et al. | |
| 6,891,969 B2 * | 5/2005 | Revill | 382/166 |
| 7,006,256 B2 * | 2/2006 | Wang et al. | 358/3.28 |
| 7,382,294 B2 * | 6/2008 | Yokose et al. | 341/76 |
| 2002/0048409 A1 | 4/2002 | Mizuno et al. | |
| 2003/0031361 A1 * | 2/2003 | Said | 382/166 |
| 2007/0019867 A1 | 1/2007 | Kwon et al. | |
| 2008/0037882 A1 * | 2/2008 | Tamura et al. | 382/232 |
| 2008/0175489 A1 * | 7/2008 | Lee et al. | 382/232 |

FOREIGN PATENT DOCUMENTS

| | | |
|---|---|---|
| JP | 10084486 | 3/1998 |
| JP | 11177979 | 7/1999 |
| JP | 2002135597 | 5/2002 |
| KR | 100256022 B1 | 2/2000 |
| KR | 1020070013156 A | 1/2007 |

* cited by examiner

*Primary Examiner* — Bernard Krasnic
(74) *Attorney, Agent, or Firm* — Onello & Mello, LLP

(57) ABSTRACT

A method of compressing a 2×2 block based binary image is provided. The method includes: determining whether pixels included in a block are included in existing patterns; generating the number N of the pixels included in the existing patterns (N is a natural number); when N is more than a predetermined value, compressing the block with a binary bit stream comprising information about patterns of the pixels included in the existing patterns and color information about the pixels having a new pattern. The method of compressing a 2×2 block based binary image reduces information damage which may occur during compression and restoration of the binary pattern so that the difference in picture quality between an original image and the restored image can be visibly improved.

10 Claims, 4 Drawing Sheets

METHOD OF COMPRESSING A BLOCK-BASED BINARY IMAGE

CROSS-REFERENCE TO RELATED APPLICATIONS

This application claims the benefit of Korean Patent Application No. 10-2008-0024892, filed on Mar. 18, 2008, in the Korean Intellectual Property Office, the contents of which are herein incorporated by reference in their entirety.

BACKGROUND

1. Field of the Invention

Example embodiments of the present invention relate to image compression. More particularly, example embodiments of the present invention relate to a method of compressing a 2×2 block based binary image including compressing pixels included in an existing pattern with minimum information and adding color information for pixels having a non-uniform pattern to a bit-stream so as to efficiently prevent degradation of image quality, when the pixels having a repeating pattern and pixels having a non-uniform pattern exist in one block.

2. Description of the Related Art

In a conventional 2×2 block based binary image compression algorithm, image data is compressed using the difference between values of neighboring pixels. Such a 2×2 block based binary image compression algorithm is commonly referred to as Differential Pulse Code Modulation (DPCM).

However, in DPCM, when pixels included in an existing pattern and pixels included in a new pattern exist in one block, information may be damaged during the compression and restoration of an image for all the pixels present in a corresponding block. Such information damage may affect a block which is subsequently compressed.

Thus, when the conventional binary image compression is used, serious visible degradation is generated in blocks having a number of non-uniform patterns and in their neighboring blocks.

SUMMARY

Example embodiments provide a method of compressing a 2×2 block based binary image capable of minimizing degradation of image quality and performing efficient compression.

According to one aspect, there is provided a method of compressing a binary image. The method includes: determining whether pixels included in a block are included in existing patterns; generating a number N of pixels of the block that are included in the existing patterns (where N is a natural number); and when N is more than a predetermined value, compressing the block to a binary bit stream, the bit stream comprising information of patterns of the pixels included in the existing patterns and color information of the pixels having a new pattern.

In one embodiment, the binary bit stream further includes mode information indicating whether the binary bit stream includes compressed binary image information. In one embodiment, the binary bit stream further includes sub-mode information indicating whether the existing pattern is used. In one embodiment, the binary bit stream further includes pattern information indicating whether first through $N^{th}$ pixels are included in the existing pattern, wherein the pixels included in the block are sequentially denoted as first through $M^{th}$ pixels and wherein M is a natural number higher than N.

In one embodiment, the binary bit stream further includes information about N. In one embodiment, the binary bit stream further includes pixel pattern-type information indicating in which pattern of the existing patterns the N pixels are included.

In one embodiment, the method further includes, when the pixels are included in the existing patterns, determining in which pattern of the existing patterns the pixels are included. In another embodiment, the binary bit stream includes pixel-type information indicating in which pattern of the existing patterns the pixels are included.

In one embodiment, the color information includes R, G, and B values of the corresponding pixel. In another embodiment, in the color information, some of the upper bits of the R, G, and B values of the corresponding pixel are stored according to a compression rate. In one embodiment, when the block includes two or more pixels having a new pattern, the color information is an average value of the pixels having the new pattern.

In one embodiment, the binary bit stream includes mode information indicating whether the binary bit stream includes compressed binary image information, sub-mode information indicating whether an existing pattern is used, pattern information indicating whether first through $N^{th}$ pixels are included in the existing patterns, wherein the pixels included in the block are sequentially denoted as first through $M^{th}$ pixels, information about N, pixel pattern-type information indicating in which pattern of the existing patterns the N pixels are included, and color information for the pixels having the new pattern.

In one embodiment, the method further includes, when N is below the predetermined value, compressing data of the block using Differential Pulse Code Modulation (DCPM).

In one embodiment, the block is a 2×2 block. In one embodiment, the predetermined value is 2.

According to another aspect, a method of compressing a 2×2 block based binary image includes determining whether pixels included in a block are included in at least one of a defined pattern A or a defined pattern B, generating a number N of pixels of the block that are included in at least one of the pattern A and the pattern B, and, when N is more than a predetermined value, compressing the block to a binary bit stream, the bit stream including information of patterns of the pixels included in at least one of the pattern A and the pattern B and color information of the pixels having a new pattern.

In one embodiment, the binary bit stream includes mode information indicating whether the binary bit stream includes compressed binary image information, sub-mode information indicating whether at least one of the pattern A and the pattern B is used, pattern information indicating whether first through third pixels are included in at least one of the pattern A and the pattern B, information about N, pixel pattern-type information indicating in which pattern from among the pattern A and the pattern B the N pixels are included, and color information for the pixels having the new pattern.

In one embodiment, the predetermined value is 2 and, when N is 3, the color information includes R, G, and B values of the corresponding pixel.

In one embodiment, when N is 2, the color information is an average value of two pixels having the new pattern.

In one embodiment, when N is below 2, the method further includes compressing data of the block using Differential Pulse Code Modulation (DCPM).

BRIEF DESCRIPTION OF THE DRAWINGS

The foregoing and other objects, features and advantages of the invention will be apparent from the more particular description of preferred aspects of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE EMBODIMENTS

Figure 1:
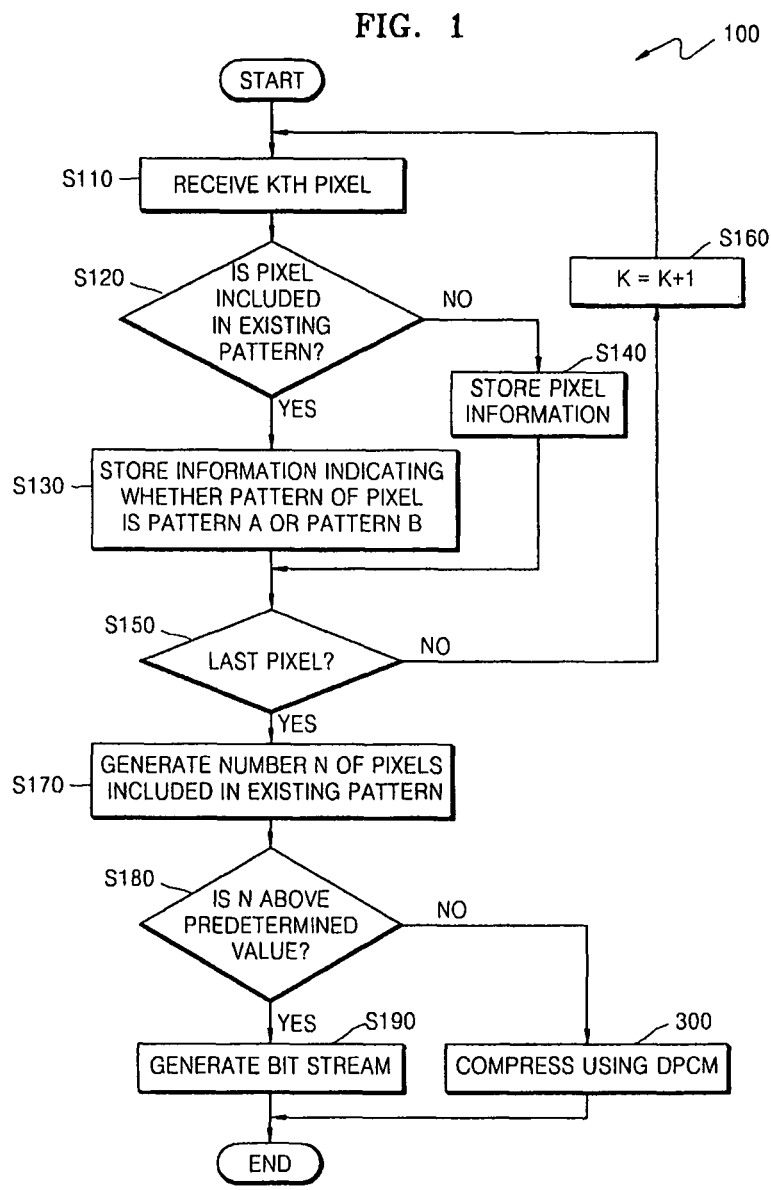
FIG. 1 is a flowchart illustrating a method of compressing a binary image according to an embodiment of the invention.

Hereinafter, example embodiments are described more fully with reference to the accompanying drawings, in which exemplary embodiments of the invention are illustrated.

In the drawings, like reference numerals denote like elements.

FIG. 1 is a flowchart illustrating a method of compressing a binary image according to an embodiment. The method of compressing a binary image according to the embodiment of FIG. 1 is, in particular, a method of compressing a 2×2 block based binary image, as illustrated in FIG. 2, in which image data is formed of 2×2 blocks and the blocks are compressed.

Figure 2:
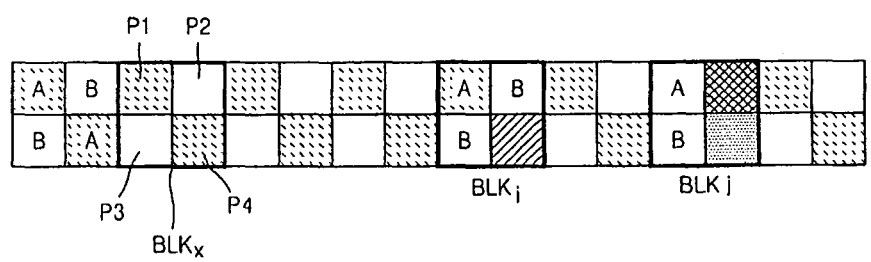
FIG. 2 illustrates image data compressed using the method of compressing a binary image of FIG. 1.

Hereinafter, for the purposes of illustration, blocks described for the method of compressing a binary image include four pixels, as illustrated in FIG. 2; however, the invention is not limited thereto. Also, the four pixels included in each block are respectively denoted as first pixel P1, second pixel P2, third pixel P3, and fourth pixel P4, as illustrated in FIG. 2. Although FIG. 2 only illustrates pixels P1-P3 of an $x^{th}$ block BLKx (where x is a natural number), an $i^{th}$ block BLKi (where i is a natural number) and a $j^{th}$ block BLKj (where j is a natural number) may each include pixels denoted as first pixel P1, second pixel P2, third pixel P3, and fourth pixel P4.

In addition, in this illustration, it is assumed that each pixel has a defined existing pattern A or pattern B, or new patterns. The pattern A or the pattern B is denoted as a defined existing pattern in the method of compressing a binary image based on a 2×2 block.

Referring to FIGS. 1 and 2, the method 100 of compressing a binary image includes receiving pixels included in an arbitrary block in operation S10. A determination is then made as to whether the received pixels are included in existing patterns in operation S120.

When the received pixels are included in existing patterns ("Yes" in operation S120), information indicating which pattern in the existing patterns includes the received pixels is stored in operation S130. That is, information indicating whether the received pixels are included in the pattern A or the pattern B is stored. On the other hand, when the received pixels are not included in existing patterns ("No" in operation S120), information about the received pixels is stored in operation S140. Here, information about the received pixels may be color information of the pixels, that is, an RGB value of the received pixels.

The above-described operations are performed on all pixels included in the corresponding blocks in operations S150 and S160. If at step S150 the pixel is not determined to be the last pixel ("No" in operation S150), then the process increments a counter to K=K+1, in operation S160, and returns to the first operation S110 of receiving a $K^{th}$ pixel. When a determination has been completed for all pixels included in one block ("Yes" in operation S150), the method 100 of compressing a binary image is used to generate the number N of the pixels (where N is a natural number) of the corresponding block that match the existing pattern, such as pattern A or pattern B, according to operation S170.

In FIG. 2, all pixels P1 through P4 of the $x^{th}$ block BLKx are included in the existing patterns. That is, the first pixel P1 and the fourth pixel P4 are included in the pattern A. The second pixel P2 and the third pixel P3 are included in the pattern B. Therefore, N for the $x^{th}$ block BLKx is determined at step S170 of FIG. 1 to be "4."

In FIG. 2, in the $i^{th}$ block BLKi, the first pixel P1 is included in the pattern A and the second and third pixels P2 and P3 are included in the pattern B. The fourth pixel P4 has a new pattern, instead of the existing pattern A or B. Thus, N for the $i^{th}$ block BLKi is determined at step S170 of FIG. 1 to be "3."

In FIG. 2, in the $j^{th}$ block BLKj, the first pixel P1 is included in the pattern A and the third pixel P3 is included in the pattern B. On the other hand, the second and fourth pixels P2 and P4 have new patterns, instead of the existing patterns A or B. Thus, N for the $j^{th}$ block BLKj is determined at step S170 of FIG. 1 to be "2." Also, the second and fourth pixels P2 and P4 of the $j^{th}$ block BLKj may each have a different pattern.

Then, whether N is more than a predetermined value is determined in operation S180. In particular, in the method 100 of compressing a binary image of FIG. 1, the predetermined value is set as "2." The predetermined value may be set as a value other than "2" according to the performance of the system, or other desired system parameters.

When it is determined at operation S180 that three or more pixels having new patterns exist in one block (N="0" and "1"), the conventional method of compressing a binary image such as Differential Pulse Code Modulation (DPCM) may be efficient, as in operation 300 of FIG. 1. Thus, if N is below the predetermined value, the binary image is compressed using DPCM in operation 300 of FIG. 1.

In FIGS. 1 and 2, when N is more than the predetermined value, in this example "2", in operation S190, the block is compressed to a binary bit stream having a data structure which is hereinafter described.

Hereinafter, the binary bit stream structures for cases in which N exceeds the predetermined value, i.e., N is "2" and N is "3," are respectively described. As described above, when N is "2," the pixels having the pattern as in the $j^{th}$ block BLKj of FIG. 2 may be included. When N is "3," the pixels having the patterns as in the $i^{th}$ block BLKi of FIG. 2 may be included.

Firstly, a binary bit stream for a block is described when N is "3", that is, the case of the $i^{th}$ block BLKi of FIG. 2.

Figure 3:
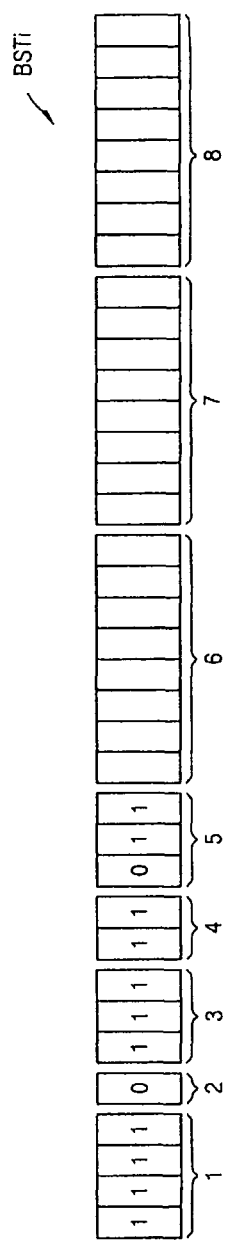
FIG. 3 illustrates a binary bit stream according to the method of compressing a binary image of FIG. 1, when N of FIG. 1 is "3".

FIG. 3 illustrates a binary bit stream BSTi for the $i^{th}$ block BLKi.

Referring to FIGS. 2 and 3, the binary bit stream BSTi includes mode information 1, sub-mode information 2, pattern information 3, information 4 about N, pixel pattern-type information 5, and color information 6, 7, and 8. However, the configuration of the binary bit stream BSTi is not limited thereto and may include some of these types of information, or other information.

Details, sizes and values of each type of information are hereinafter described in more detail. However, each type of information is not limited to the described details, sizes and values.

The mode information 1 is formed of four bits, as illustrated in FIG. 3. The mode information 1 indicates that the binary bit stream BSTi includes compressed binary image information. Thus, the binary bit stream BSTi according to the method of compressing a binary image of an embodiment, as illustrated in FIG. 3, is set to have the binary value of "1111" for the mode information 1.

The sub-mode information 2 is formed of one bit, as illustrated in FIG. 3. The sub-mode information indicates whether the binary bit stream BSTi uses the existing pattern (pattern A or pattern B). Thus, the binary bit stream BSTi according to the method of compressing a binary image of an embodiment, as illustrated in FIG. 3, is set to have the binary value of "0" for the sub-mode information 2.

The pattern information 3 is formed of three bits, as illustrated in FIG. 3. The pattern information 3 of FIG. 3 indicates whether the first pixel P1 through the third pixel P3 of the corresponding block are included in the existing patterns A and B. The pixel having the existing pattern A or B is set to have the binary value of "1" and the pixel having a new pattern is set to have the binary value of "0." In the $i^{th}$ block BLKi, the first pixel P1 through the third pixel P3 of the $i^{th}$ block BLKi are included in the existing pattern and thus, the binary bit stream BSTi has the binary value of "111" for the pattern information 3, as illustrated in FIG. 3. Alternatively, the pixel having the existing pattern A or B may be set to have the binary value of "0" and the pixel having a new pattern may be set to have the binary value of "1."

Although where N is "3," when the first pixel P1, the third pixel P3, and the fourth pixel P4 have the existing pattern A or B, unlike the $i^{th}$ block BLKi, the pattern information 3 has the binary value of "101." That is, since the binary bit stream BSTi of FIG. 3 is the binary bit stream when only one pixel having a new pattern exists in one block, whether the fourth pixel P4 is included in the existing pattern, in addition to the first through third pixels P1 through P3, is determined from the pattern information 3.

Whether the binary bit stream BSTi of FIG. 3 corresponds to the binary bit stream when N is "3" is determined according to the information 4 about N. The information 4 about N is formed of one or more bits and is formed of two bits in the binary bit stream BSTi of FIG. 3. When N is "3," the information 4 about N, as illustrated in FIG. 3, has the binary value of "11."

Then, the binary bit stream BSTi of FIG. 3 includes the pixel pattern-type information 5 formed of three bits. The pixel pattern-type information 5 indicates in which one of the pattern A and the pattern B the pixels are included. In FIG. 3, when the corresponding pixel is included in the pattern A, the binary value is "0" and, when the corresponding pixel is included in the pattern B, the binary value is "1." Thus, the binary bit stream BSTi of FIG. 3 for the $i^{th}$ block BLKi of FIG. 2 has the binary value of "011" for the pixel pattern-type information 5. Alternatively, when the corresponding pixel is included in the pattern A, the binary value may be "1" and, when the corresponding pixel is included in the pattern B, the binary value may be "0."

The color information 6, 7, and 8 are respectively formed of eight bits with respect to the R, G, and B values for the pixel having a new pattern (fourth pixel P4). However, the R, G, and B values may be stored in upper seven bits of the eight bits. In addition, the R, G, B values may be stored in some of the upper bits according to the compression rate.

Since the binary bit stream is generated, compression of one block BLKi may be performed. A method of compressing a block such as the $j^{th}$ block BLKj is described hereinafter for an embodiment in which N is "2."

Figure 4:
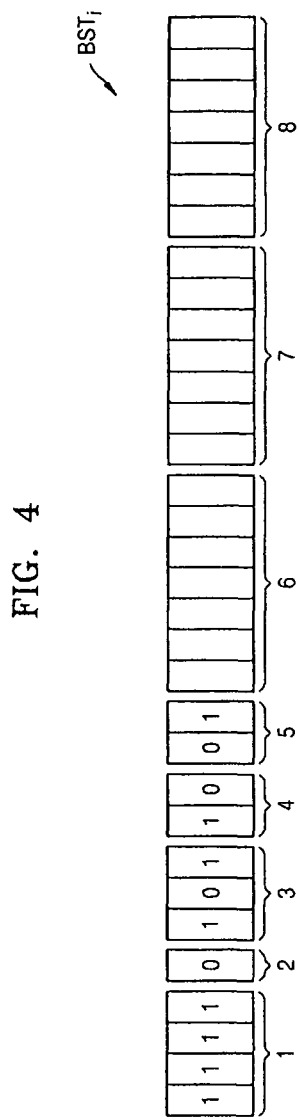
FIG. 4 illustrates a binary bit stream according to the method of compressing a binary image of FIG. 1, when N of FIG. 1 is "2".

FIG. 4 illustrates a binary bit stream BSTj for the $j^{th}$ block BLKj.

Referring to FIGS. 2 and 4, the binary bit stream BSTj includes mode information 1, sub-mode information 2, pattern information 3, information 4 about N, pixel pattern type information 5, and color information 6, 7, and 8, as in the binary bit stream BSTi of FIG. 3. In addition, details of each type of information are the same as those of in FIG. 3. However, sizes and values of some of the information may be different from those of the binary bit stream BSTi of FIG. 3. These differences are hereinafter described in more detail.

The mode information 1 and the sub-mode information 2 of the binary bit stream BSTj of FIG. 4 are the same as those of FIG. 3. In addition, the binary bit stream BSTj of FIG. 4 may also include the pattern information formed of three bits, as in FIG. 3. However, in the $j^{th}$ block BLKj, the first pixel P1 and the third pixel P3 are included in the existing pattern and the second pixel P2 is included in a new pattern so that, as illustrated in FIG. 4, the pattern information 3 has the binary value of "101."

Since the binary bit stream BSTj of FIG. 4 is the binary bit stream for the block when N is "2," the information 4 about N has the binary value of "10." Also, unlike FIG. 3, only the first pixel P1 and the third pixel P3 of the $j^{th}$ block BLKj are included in the existing pattern A or B, and the pixel pattern-type information 5 of FIG. 4 is formed of two bits. Here, the first pixel P1 of the $j^{th}$ block BLKj is included in the pattern A and the third pixel P3 of the $j^{th}$ block BLKj is included in the pattern B so that the pixel pattern-type information 5 of FIG. 4 has the binary value of "01."

The color information 6, 7, and 8 of the binary bit stream BSTj of FIG. 4 are respectively formed of eight bits with respect to the R, G, and B values for the pixel having a new pattern (fourth pixel P4), as in FIG. 3. In addition, the R, G, and B values may be stored in upper seven bits of the eight bits. However, the color information 6, 7, and 8 of the binary bit stream BSTj of FIG. 4 may have average values of color information of two pixels having a new pattern, that is, the average value of each R, G, and B value of the second pixel P2 and the fourth pixel P4.

As described above, in the method of compressing a 2×2 block based binary image according to an embodiment, when an existing pattern and a new pattern are mixed in one block, the pixels included in the existing pattern are compressed with minimum information and the pixels having new patterns include color information so that degradation of picture quality can be efficiently prevented.

The method of compressing a 2×2 block based binary image reduces information damage which may occur during compression and restoration of the binary pattern so that the difference in picture quality between an original image and the restored image can be visibly improved.

Therefore, the method of compressing a 2×2 block based binary image can be applied to an image compression circuit, in which picture quality is important, such as a frame memory compression engine of a response speed compensation circuit of a liquid crystal display (LCD) panel or a compression circuit for transmitting an image which requires a wide bandwidth.

While aspects of the present invention have been particularly shown and described with reference to differing embodiments thereof, it should be understood that these exemplary embodiments should be considered in a descriptive sense only and not for purposes of limitation. Thus, although a few embodiments have been shown and described, changes may be made in these embodiments.

For example, although four pixels included in the existing pattern are not illustrated, in view of the description of the $i^{th}$ block of FIG. 2 in which three pixels are included in the existing patterns a similar process can be applied to an embodiment in which four pixels are included in the existing patterns.

While the invention has been particularly shown and described with reference to exemplary embodiments thereof, it will be understood that various changes in form and details may be made therein without departing from the spirit and scope of the following claims.

What is claimed is:

1. A method of compressing a 2×2 block based binary image, the method comprising:
    determining whether each pixel included in a block corresponds to existing patterns included in an existing block using a computer processor;
    generating a number N of pixels of the block that are included in the existing patterns using a computer processor, wherein N is a natural number; and
    when N is more than a predetermined value, compressing the block to a binary bit stream using a computer processor, the bit stream comprising information of patterns of the pixels included in the existing patterns and color information of the pixels having a new pattern,
    wherein the binary bit stream further comprises:
        mode information indicating whether the binary bit stream includes compressed binary image information;
        sub-mode information indicating whether the existing pattern is used;
        pattern information indicating whether first through $N^{th}$ pixels are included in the existing patterns, wherein the pixels included in the block are sequentially denoted as first through $M^{th}$ pixels, wherein M is a natural number higher than N;
        information about N;
        pixel pattern type information indicating in which pattern of the existing patterns the N pixels are included; and
        color information for the pixels having the new pattern.

2. The method of claim 1, wherein the color information comprises Red (R), Green (G), and Blue (B) values of the corresponding pixel.

3. The method of claim 2, wherein in the color information, some of upper bits of the R, G, and B values of the corresponding pixel are stored according to a compression rate.

4. The method of claim 1, wherein when the block comprises two or more pixels having a new pattern, the color information is an average value of the pixels having the new pattern.

5. The method of claim 1, further comprising, when N is below the predetermined value, compressing data of the block using Differential Pulse Code Modulation (DPCM).

6. The method of claim 1, wherein the predetermined value is 2.

7. A method of compressing a 2×2 block based binary image, the method comprising:
    determining whether each pixel included in a block corresponds to at least one of a defined pattern A and a defined pattern B using a computer processor, wherein the defined pattern A and the defined pattern B are included in an existing block;
    generating a number N of pixels of the block that are included in at least one of the pattern A and the pattern B using a computer processor, wherein N is a natural number; and
    when N is more than a predetermined value, compressing the block to a binary bit stream using a computer processor, the bit stream comprising information of patterns of the pixels included in at least one of the pattern A and the pattern B and color information of the pixels having a new pattern,
    wherein the binary bit stream further comprises:
        mode information indicating whether the binary bit stream includes compressed binary image information;
        sub-mode information indicating whether at least one of the pattern A and the pattern B is used;
        pattern information indicating whether first through third pixels included in the block are included in at least one of the pattern A or the pattern B;
        information about N;
        pixel pattern type information m among the pattern A and the pattern B the N pixels are included; and
        color information for the pixels having the new pattern.

8. The method of claim 7, wherein the predetermined value is 2, and, when N is 3, the color information comprises Red (R), Green (G), and Blue (B) values of the corresponding pixel.

9. The method of claim 7, wherein, when N is 2, the color information is an average value of two pixels having the new pattern.

10. The method of claim 7, further comprising, when N is below 2, compressing data of the block using Differential Pulse Code Modulation (DPCM).

* * * * *